(12) United States Patent
Prabhakar

(10) Patent No.: US 12,469,838 B2
(45) Date of Patent: Nov. 11, 2025

(54) SYSTEMS AND METHODS INVOLVING USE OF NITROGEN-CONTAINING PLASMA TO TREAT LITHIUM IRON PHOSPHATE CATHODES

(71) Applicant: Venkatraman Prabhakar, Pleasanton, CA (US)

(72) Inventor: Venkatraman Prabhakar, Pleasanton, CA (US)

(73) Assignee: Sparkz Inc., Livermore, CA (US)

( * ) Notice: Subject to any disclaimer, the term of this patent is extended or adjusted under 35 U.S.C. 154(b) by 86 days.

(21) Appl. No.: 18/103,488

(22) Filed: Jan. 30, 2023

(65) Prior Publication Data

US 2023/0231103 A1   Jul. 20, 2023

Related U.S. Application Data

(63) Continuation-in-part of application No. 17/308,042, filed on May 4, 2021, now Pat. No. 12,015,142.
(Continued)

(51) Int. Cl.
  *H01M 4/04*    (2006.01)
  *H01M 4/1391*  (2010.01)
  (Continued)

(52) U.S. Cl.
  CPC ....... *H01M 4/0459* (2013.01); *H01M 4/0404* (2013.01); *H01M 4/0435* (2013.01);
  (Continued)

(58) Field of Classification Search
  CPC ............. H01M 4/0404; H01M 4/0459; H01M 4/0435; H01M 4/0471; H01M 4/1391;
  (Continued)

(56) References Cited

U.S. PATENT DOCUMENTS 5,024,716 A * 6/1991 Sato ................. H01J 37/32192
                                            204/298.37
2010/0086851 A1* 4/2010 Wang ................. H01M 4/0421
                                            427/535
(Continued)

FOREIGN PATENT DOCUMENTS

CN    105336505    2/2016
EP     2706597      8/2016
(Continued)

OTHER PUBLICATIONS

Machine language translation of KR20160112767, published Sep. 28, 2016, also submitted herewith.
(Continued)

Primary Examiner — Brian K Talbot
(74) Attorney, Agent, or Firm — Clark Hill PLC

(57) ABSTRACT

Systems and methods related to manufacturing of Lithium-Ion cells and Lithium-Ion cell cathode materials composed of LFP (Lithium Iron Phosphate) or LMFP (Lithium Manganese Iron Phosphate) are disclosed. In one exemplary implementation, there is provided a method of using a Nitrogen-containing plasma to treat the Lithium-Ion cell's LFP or LMFP cathode materials. Moreover, the method may include treating the LFP or LMFP cathode materials before and/or after coating the cathode materials on a metal foil.

20 Claims, 5 Drawing Sheets

Related U.S. Application Data which is a continuation of application No. PCT/US2021/030533, filed on May 3, 2021.

(60) Provisional application No. 63/019,399, filed on May 3, 2020.

(51) Int. Cl.
  *H01M 4/505* (2010.01)
  *H01M 4/525* (2010.01)
  *H01M 10/04* (2006.01)
  B05D 3/14 (2006.01)
  H01M 4/02 (2006.01)

(52) U.S. Cl.
  CPC ....... *H01M 4/0471* (2013.01); *H01M 4/1391* (2013.01); *H01M 4/505* (2013.01); *H01M 4/525* (2013.01); *H01M 10/0404* (2013.01); *B05D 3/141* (2013.01); *B05D 3/145* (2013.01); *H01M 2004/028* (2013.01)

(58) Field of Classification Search
  CPC .. H01M 4/505; H01M 4/525; H01M 10/0404; H01M 2004/028; B05D 3/141; B05D 3/145
  USPC ................................................ 427/535, 115
  See application file for complete search history.

(56) References Cited

U.S. PATENT DOCUMENTS

| | | |
|---|---|---|
| 2014/0050656 A1 | 2/2014 | Kang et al. |
| 2014/0141355 A1 | 5/2014 | Huang et al. |
| 2014/0326918 A1 | 11/2014 | Chen |
| 2016/0340772 A1 | 11/2016 | Smith |
| 2016/0351950 A1 | 12/2016 | Ohuchi |
| 2017/0301958 A1 | 10/2017 | Deng et al. |
| 2019/0051930 A1 | 2/2019 | de Souza et al. |
| 2019/0207242 A1* | 7/2019 | Lin ...................... H01M 4/622 |
| 2019/0280305 A1 | 9/2019 | Torita et al. |
| 2020/0203706 A1 | 6/2020 | Holman et al. |
| 2021/0189145 A1* | 6/2021 | Noh .......................... C09D 1/00 |
| 2021/0288300 A1 | 9/2021 | Gayden |
| 2021/0313617 A1 | 10/2021 | Yushin |

FOREIGN PATENT DOCUMENTS

| | | | |
|---|---|---|---|
| JP | 2004164934 | | 6/2004 |
| JP | 2020024947 A | * | 2/2020 |
| KR | 20160112767 | | 9/2016 |

OTHER PUBLICATIONS

Parent (CIP) U.S. Appl. No. 17/308,042, filed May 4, 2021, now U.S. Pat. No. 12,015,142, issued Jun. 18, 2024, cited per 37 C.F.R. 1.98(d)(1).

Int'l application No. PCT/US2021/030533, filed May 3, 2021 (parent of U.S. Appl. No. 17/308,042), published as WO 2021/225998 on Nov. 11, 2021, cited per 37 C.F.R. 1.98(d)(1).

International Search Report and Written Opinion mailed Jul. 29, 2021, in Int'l application No. PCT/US2021/030533; 10 pgs total.

U.S. Appl. No. 63/019,399, filed May 3, 2020, priority application of PCT/US2021/030533, cited per 37 C. F.R. 1.98(d)(1).

* cited by examiner

SYSTEMS AND METHODS INVOLVING USE OF NITROGEN-CONTAINING PLASMA TO TREAT LITHIUM IRON PHOSPHATE CATHODES

CROSS-REFERENCE TO RELATED APPLICATION(S) INFORMATION

This application is a continuation-in-part of application Ser. No. 17/308,042, May 4, 2021, published as US2021/0343999A1, on Nov. 4, 2021, now U.S. Pat. No. 12,015,142, which is a continuation of Int'l application No. PCT/US21/30533, filed May 3, 2021, published as WO 2021/225998A1, which claims benefit/priority of U.S. provisional application No. 63/019,399, filed May 3, 2020, and claims benefit/priority of provisional patent application No. 63/304,613, filed Jan. 30, 2022, all of which are incorporated herein by reference in entirety.

BACKGROUND

Lithium-ion batteries are widely used in consumer electronics as well as electric vehicles and energy storage. One type of Lithium-ion batteries uses Lithium Iron Phosphate (LiFePO4 also known as LFP) as the cathode material. The invention described herein incorporates nitrogen into the cathode material, with more nitrogen near the surface of the LFP particles to thereby improve the safety and reliability of such batteries with LFP cathode materials. It is known in the art that the plasma exposure for Nickel-Cobalt-Manganese (NMC or NCM) cathode materials can react with the NMC metals. Regarding certain solution(s) to such systems, however, a main effect is to improve the moisture sensitivity. The moisture sensitivity is due to the presence of Nickel in NMC cathode and this is not an issue for the LFP/LMFP cathode lithium-ion cells. It is also known in prior art that LFP material can be exposed to plasma for using high energy particles to bombard the surface of LFP particles and create defects which may improve the diffusion of Lithium through the surface of the LFP particles. To generate these high energy particles, the plasma needs to be a radio frequency plasma with a frequency in the range of 13.56 MHz.

As such, as set forth below, one or more exemplary aspects of the present inventions may overcome such drawbacks and/or otherwise impart innovations consistent with the systems and methods herein via the provision of using Nitrogen-containing plasma to treat LFP/LMFP Li-ion cathode materials during the manufacturing process for LFP/LMFP Li-ion cells.

Overview

Systems and methods related to manufacturing of Lithium-Ion cells and Lithium-Ion cell cathode materials composed of LFP (Lithium Iron Phosphate) or LMFP (Lithium Manganese Iron Phosphate) are disclosed. In one exemplary implementation, there is provided a method of using a Nitrogen-containing plasma to treat the Lithium-Ion cell's LFP or LMFP cathode materials. Moreover, the method may include treating the LFP or LMFP cathode materials before and/or after coating the cathode materials on a metal foil. As explained, above, it is known in the art that plasma exposure for Nickel-Cobalt-Manganese (NMC or NCM) cathode materials can react with the NMC metals. However, for LFP (Lithium Iron Phosphate) or LMFP (Lithium Manganese Iron Phosphate) materials, the technology involves different mechanism(s) since there is no nickel available, i.e., unlike with NMC cathode material(s). As such, consistent with the present innovations, systems and methods herein disclose how a plasma containing reactive nitrogen gas may be utilized to incorporate nitrogen on the surface of the LFP/LMFP particles. Inter alia, incorporation of nitrogen in LFP/LMFP particles improves the interface between the cathode particles and electrolyte in the Lithium-ion battery. Among other distinctions, this is in contrast to prior technologies involved with exposing NMC particles to a plasma, where main effects are directed to disparate benefits, such as improving the moisture sensitivity.

Further, while use of some high energy particle and radio frequency plasmas are known, bombarding the surface of LFP particles and creating defects may also cause degradation in the LFP particles crystal structure and hence are difficult to use, especially in mass production. In contrast, herein, a plasma such as a microwave plasma (e.g., with a frequency of greater than 800 MHz such as 915 MHz or 2.45 GHZ, etc.) rather than a radio frequency plasma may be utilized. Among other things, such a plasma will not allow bombardment of the surface with high energy particles. Here, though, it is noted that the gases used in the microwave plasma (such as nitrogen, oxygen, fluorine etc.) will be reactive and still react with the cathode material surface without the high energy particle bombardment. Alternatively, consistent with the innovations herein, a downstream plasma, where the plasma is generated separately from the reaction chamber, may be utilized, wherein the reactive gases move into the reaction chamber to react with the cathode material, while not allowing a high energy bombardment of the cathode material.

Additionally, with respect to some embodiments, conventional approaches to incorporate nitrogen via plasma onto materials are not applicable to and otherwise would not work vis-à-vis the disclosed technology related to treating LFP/LMFP cathode materials noted herein and/or using the process parameters herein for fabricating such LFP/LMFP Li-ion cells. For instance, when exposing metal foils to nitrogen containing plasma, a high voltage may be used to accelerate the ions to bombard the metal. This creates an ion bombardment zone on the surface of the metal. In contrast, such higher ion bombardment is not desired in the case of treating LFP/LMFP cathode materials, and could cause adverse effects, such as destroying the crystalline structure of the cathode materials. Therefore, in the present invention, there is no additional voltage applied on the cathode materials or foil to minimize any ion bombardment. Additionally, when exposing cathode powder to ammonia requires a high temperature (100C to 400C) as well as a very long period of time. This makes the ammonia exposure without a plasma not workable for a mass-production manufacturing line.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION OF CERTAIN ILLUSTRATIVE IMPLEMENTATIONS

Figure 1:
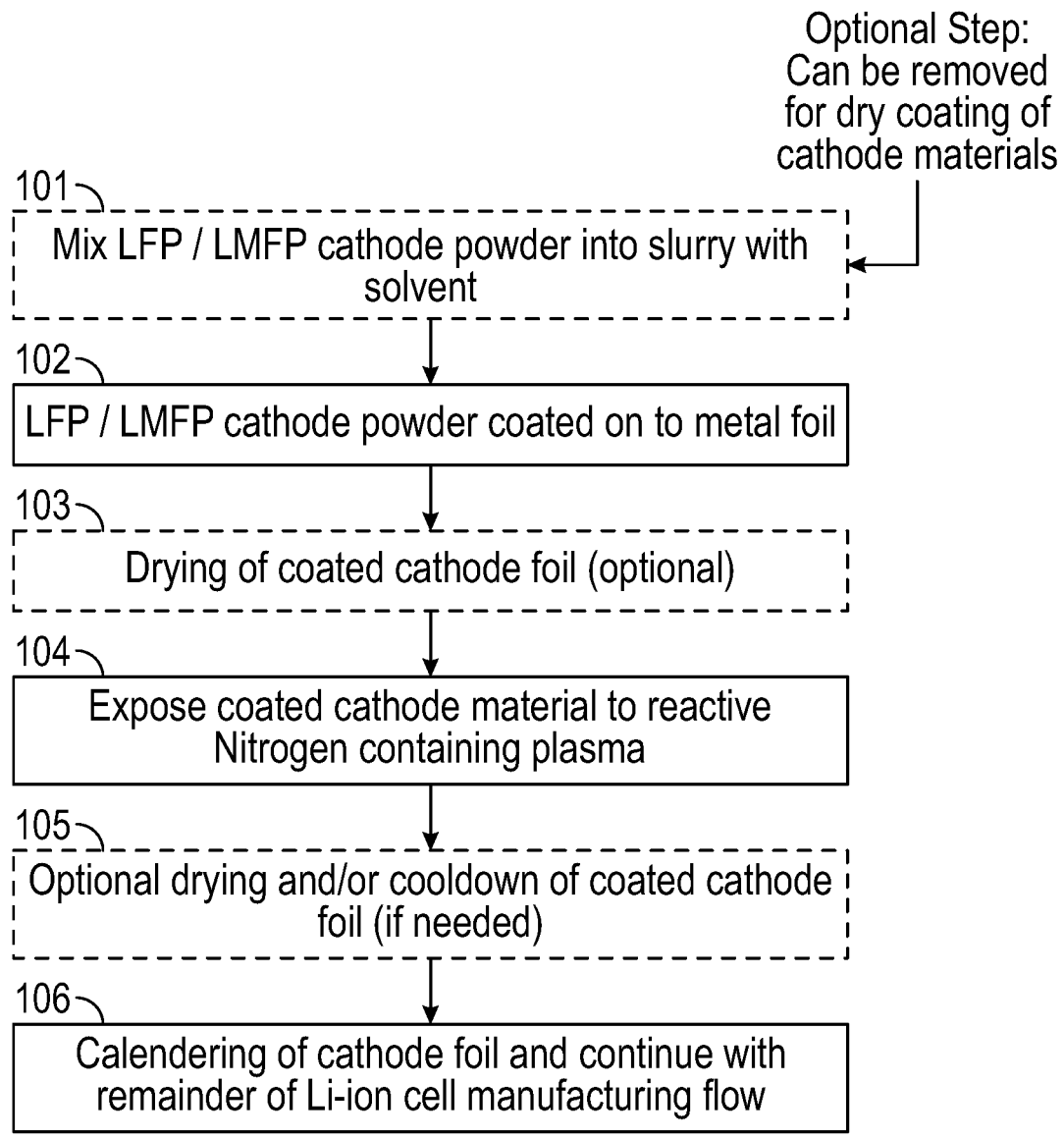
FIG. 1 is a flow diagram illustrating steps of a method for constructing one type of LFP/LMFP Lithium-ion cell, consistent with exemplary aspects of certain embodiments of the disclosed technology.

Various detailed embodiments of the present disclosure, taken in conjunction with the accompanying figures, are disclosed herein. However, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

While other aspects are involved, the present disclosure focuses on the manufacturing process of the cathode for LFP/LMFP Lithium-ion cells. As explained in more detail, below, and consistent with the disclosed technology, systems and methods herein involving innovative utilization and/or incorporation of Nitrogen into Lithium-ion battery cathode materials are disclosed, such as for Nickel-rich (Ni-rich) cathodes, and the like. Further, implementations of the disclosed technology and innovations herein do not add significant costs to the manufacture of such Li-ion batteries. Accordingly, consistent with aspects herein, the overall cost of building and operating Lithium-ion cell factories using the Nickel-rich (e.g., greater than or equal to 50% Nickel, as atomic ratio of cathode metallic elements) cathode materials is reduced.

Turning to present implementations and consistent with one or more aspects of the innovations herein, new systems and methods of incorporating Nitrogen into Li-ion battery cathodes are disclosed. Specifically, in this invention, we disclose systems and methods to incorporate nitrogen in the Lithium Iron Phosphate (LiFePO4 or LFP) cathodes. As is known in the art, various LFP cathodes also include binder, carbon, etc. in addition to the LFP material.

In one illustrative implementation (one of various implementations/embodiments), the new method disclosed herein involves treating the cathode material with a nitrogen containing plasma after coating the cathode material on the electrode. For this embodiment, the steps are shown in the flow chart of FIG. 1. The drying of the coated cathode foil can be done in the standard way before or after the plasma treatment. The plasma source gas can be any nitrogen containing gas or gases. For example, it could be pure N2 or a combination of N2/O2 in any percentage including air (~80% N2, ~20% O2). Other gases, such as NH3 (ammonia), NF3, or a combination of gases such as N2/NF3 or N2/NH3 or N2/O2/NH3 or N2/O2/NF3 or N2/SF6 or N2/SF6/O2 can be used as the nitrogen source gas for the plasma treatment. In an alternative embodiment, a multi-step plasma treatment process can be employed. For example, one step with N2/SF6 or N2/NF3 could be used followed by another step with N2, or N2/O2 or N2/NH3. This is only one illustrative example of a multi-step process, but many other multi-step plasma treatment combinations are possible. By this plasma treatment using a reactive nitrogen-containing gas as set forth herein, the LFP particles which are part of the coated cathode material will get/obtain nitrogen incorporated into the particles. Specifically, in some embodiments, more nitrogen will be incorporated on the surface of the LFP particles and less will be incorporated in the interior of the LFP particles. Such nitrogen incorporation improves the interface between the LFP particles and the electrolyte. Further, consistent with embodiments, the plasma will be at a much higher frequency than radio-frequency plasma (13.56 MHz) to avoid high energy ion bombardment of the LFP and LMFP cathode particles. For example, the plasma frequency in this embodiment can be between 800 MHz and 5 GHz, and more specifically between 900 MHz and 2.5 GHz. For example, the frequency of the microwave plasma can be 915 MHz or 2.45 GHz.

FIG. 1 is a flow diagram illustrating steps of a method for constructing one type of LFP/LMFP Lithium-ion cell, consistent with exemplary aspects of certain embodiments of the disclosed technology. As shown in FIG. 1, a first step 101 shown may be an optional step of mixing cathode powder into a slurry with a solvent. This step can be omitted in some cases where a dry casting method is used for coating the cathode material onto the metal foil. In step 102, the cathode slurry is coated on the metal foil. That is followed by step 103, where the coated cathode foil is dried in one or more dryer chambers. These steps 101, 102, 103 are known existing processes. Next, however, a new step associated with the innovations described herein is step 104, where the coated cathode foil is exposed to a plasma containing reactive nitrogen-containing gases. Among other things, this new step 104 will incorporate nitrogen into the LFP cathode particles which are already coated onto the cathode foil. The nitrogen-containing gases could include N2, N2/O2, or other gases, such as NH3 (ammonia), NF3, or a combination of gases such as N2/NF3 or N2/NH3 or N2/O2/NH3 or N2/O2/NF3 or N2/SF6 or N2/SF6/O2. As mentioned before any of these gases of a combination of these gases can be used as the nitrogen source gas for the plasma treatment. Following plasma exposure in step 104, there may be another optional step 105 which may be a cool-down step and/or another optional step of further drying the cathode foil. Following step 105, the foil may be coated on the backside following the same steps as mentioned above. After the backside coating, the coated cathode foil on the backside may also be exposed to the plasma treatment with the reactive nitrogen-containing gases. Then the foil goes into the conventional calendering step 106 either as a single-side coated foil or as a double-side coated foil. After the calendering, the cathode foil is taken through conventional subsequent processing including vacuum drying, and then put together with separator, anode foil and electrolyte to form a Lithium-ion cell.

In some embodiments, the electrolyte may be a liquid electrolyte. Overall, consistent with one or more embodiments herein, the interface of the liquid electrolyte with the LFP particles is improved via the disclosed technology by incorporating nitrogen into the surface of the LFP/LMFP particles. Further, such improved interface properties between the LFP/LMFP and the electrolyte result in improved safety and performance of the Lithium-ion cell.

Figure 2:
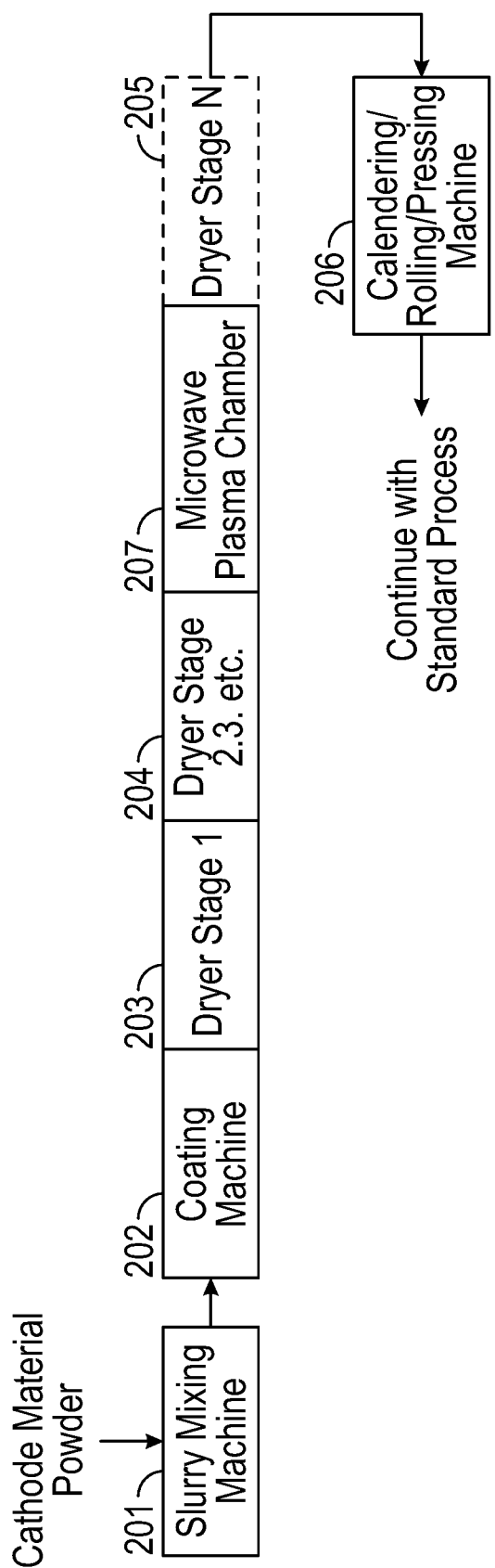
FIG. 2 is a block diagram depicting components of one exemplary system used for constructing one illustrative type of LFP/LMFP Lithium-ion cell, consistent with exemplary aspects of certain embodiments of the disclosed technology.

FIG. 2 is a block diagram depicting components of one exemplary system used for constructing one illustrative type of LFP/LMFP Lithium-ion cell, consistent with one or more aspects of certain embodiments of the disclosed technology. Referring to FIG. 2, the cathode powder (containing LFP and/or LMFP) along with solvent, binder, carbon black etc. is/are fed into the mixer or mixing machine 201 to form the slurry. The slurry is then fed into coating machine 202 either by automatic feed or by manual feed. The coating is done typically done by feeding a metal foil (e.g. Aluminum, etc.) into the coating machine 202 using, for example, roll-to-roll processing. As the foil is fed through the coating machine 202, the cathode slurry is coated on the foil by using any of the known methods such as slot-die, extrusion, gravure, etc. After coating, the foil continues to be fed into dryers or drying stages, e.g., such as first dryers 203 and 204. Although only 2 dryer stages are shown in FIG. 2, it is understood that the dryer stages can vary both in length and number of stages depending on the process requirements, slurry composition, and the like. In some embodiments, such dryer stages 203, 204 may have heaters and a solvent exhaust collection and recovery system (not shown). According to the exemplary embodiment illustrated in FIG. 2, a last dryer stage 204 is followed by the plasma chamber 207, which exposes the coated LFP/LMFP cathode material to the plasma which contains the nitrogen gas. As set forth above, such nitrogen-containing gases could be pure N2 or combination of N2/O2 in any percentage including air (~80% N2, ~20% O2). Other gases, such as NH3 (ammonia), NF3, or a combination of gases such as N2/NF3 or N2/NH3 or N2/O2/NH3 or N2/O2/NF3 or N2/SF6 or N2/SF6/O2 can be used as the reactive nitrogen source gas for the plasma treatment. The plasma frequency may be between about 800 MHz to about 5000 MHz (i.e. 5 GHz), or between about 800 MHz to about 2500 MHz (i.e. 2.5 GHz), or, in some implementations, may be a specific frequency such as 915 MHz or 2450 MHz (2.45 GHz). The plasma pressure may be between 0.1 and 2 atmospheres or more specifically between 0.5 and 1.5 atmospheres. In some cases, the plasma pressure may be at 1 atmosphere. It is understood that although only one plasma chamber is shown in 207, there could be more than one plasma chamber or plasma chambers of varying lengths depending on process requirements. While this particular embodiment shows some drying stages before the plasma chamber, in other embodiments, the plasma chambers could be placed first and the dryer stages afterwards. After plasma chamber 207, one or more optional dryer stage(s) 205 (which may also include, or instead be, a cool-down stage without any heaters, e.g., in alternative embodiments). Once the foil passes through all the dryer stages and plasma chamber, it may then be rewound. After such rewinding, in some embodiments, the foil may be sent back in through various same and/or differing coating, dryer, and/or plasma stages to coat the backside of the foil with cathode material, i.e., for dual-sided coating when that is desired. Alternatively, foil may be directly (with or without rewinding) be sent to a new set of coater/dryer/plasma stages to coat and treat the backside of the foil with cathode material. The backside coated foil may also be treated with the reactive nitrogen-containing plasma. After such steps and stages, the foil is fed through the calendering/rolling machine 206 where the cathode materials is pressed between rollers or similarly processed. After the calendering machine 206, the cathode foil or resulting material goes through other or additional standard processes, including slitting/punching machines to get the right size and then it is wound or stacked together with the separator and anode followed by putting into cans or containers (e.g., such as pouches or other such containers, etc.), followed by filling or addition of the electrolyte to make the Li-ion cell.

Figure 3:
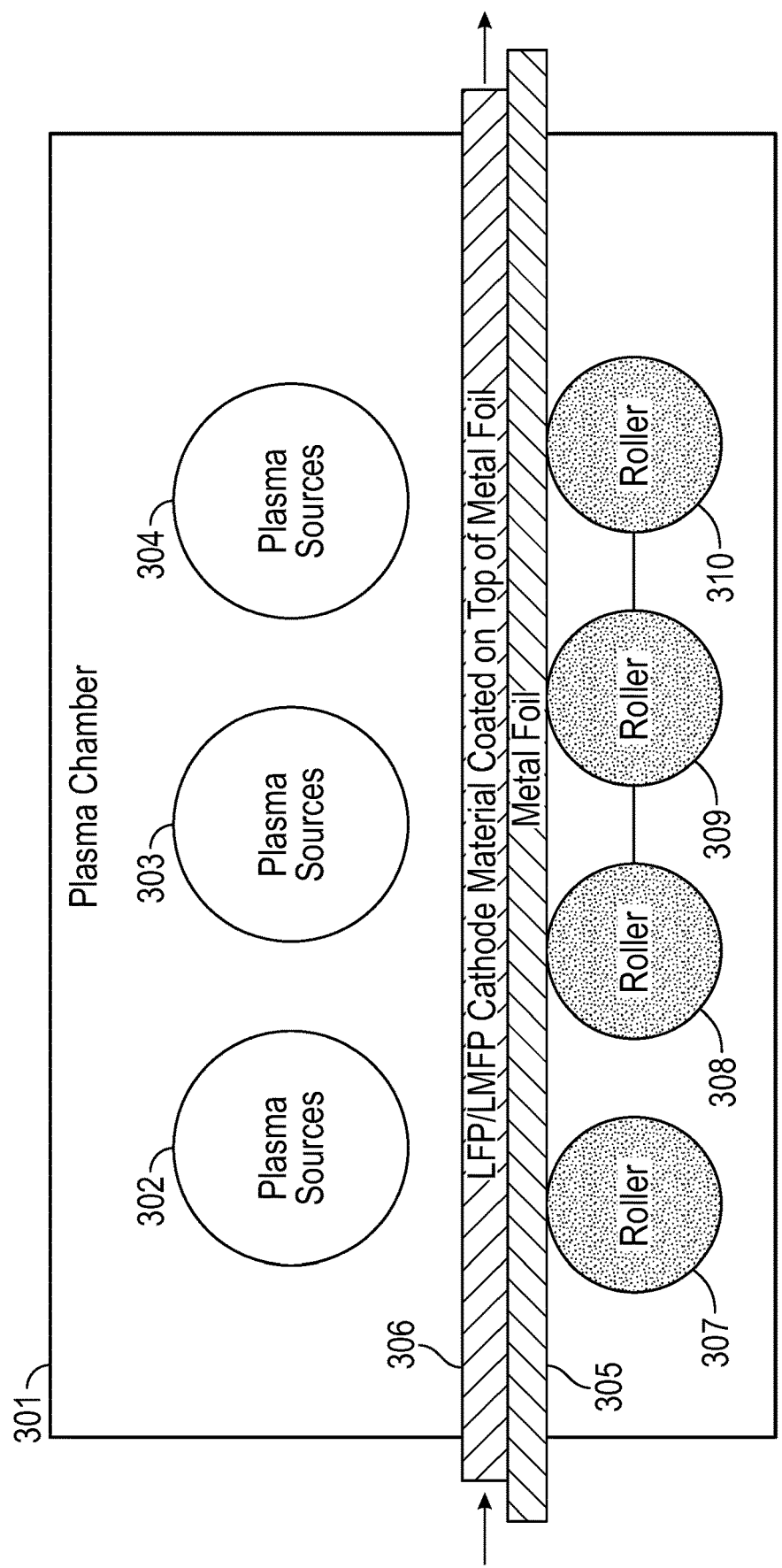
FIG. 3 is a diagram illustrating components and aspects of an exemplary microwave plasma chamber of an exemplary system used for constructing LFP/LMFP Lithium-ion cells, consistent with exemplary aspects of certain embodiments of the disclosed technology.

FIG. 3 is a diagram illustrating components and aspects of an exemplary plasma chamber 301 of an exemplary system used for constructing Lithium-ion cells, consistent with exemplary aspects of certain embodiments of the disclosed technology. Referring to FIG. 3, consistent with aspects of the disclosed technology, such exemplary plasma chamber 301 may be utilized as the plasma chamber(s) shown and described in FIG. 2. According to some embodiments, such plasma chamber 301 may be configured to allow roll-to-roll processing in order to facilitate production. The example embodiment of FIG. 3 shows the metal foil 305 with the coated cathode material 306 moving through the chamber from left to right. The rollers 307, 308, 309, 310 allow the foil to move smoothly. The number of rollers may be adjusted to lower or higher quantity to allow the foil to move appropriately through the plasma chamber without wrinkling or creases. Further, in this illustrative embodiment, exemplary plasma sources are shown as 302, 303 and 304. According to various embodiments of the disclosed technology, the quantity and position(s) of such sources 302, 303, 304 may be adjusted in various ways to uniformly or suitably expose the coated cathode layer 306 to the plasma containing the reactive nitrogen-containing gases as disclosed above. According to the disclosed technology, the plasma frequency or frequency range or ranges may be as set forth above. Similarly, in some aspects, the Nitrogen-containing gases may be as set forth above, e.g., they may include a combination of Nitrogen and Air (which has mostly N2/O2). In other embodiments, gases such as NH3 (ammonia), NF3 (Nitrogen Trifluoride), N2O (Nitrous oxide), NO (Nitric oxide) may be utilized and/or included. In still other embodiments combinations of gases such as N2/O2/NF3 or N2/SF6 or N2/SF6/O2, can be used for the plasma exposure. In some embodiments, the plasma source may be a remote plasma source or downstream plasma source, so that the source may be outside the chamber and the radicals generated by the plasma may be fed into the plasma exposure chamber. In other embodiments, the plasma may be generated as a low pressure (e.g., less than 0.5 atm, etc.) plasma source. In still other embodiments, an atmospheric pressure plasma source may be used with a pressure between 0.5 and 1.5 atmospheres, or in one or more specific embodiments, at or about 1 atmosphere pressure. The plasma frequency is in the microwave range (800 MHz to 5 GHz) to avoid high energy ion bombardment of the LFP/LMFP cathode material, since the high energy ion bombardment may cause damage to the crystal structure of the LFP/LMFP cathode material and hence not be suitable for mass production.

Various embodiments may be also configured such that nitrogen-containing microwave plasma gas of different composition are utilized to treat coated metal foils and/or cathode powder. For example, such nitrogen containing gas may comprise, consist essentially of, or consists of N2. In another example, the nitrogen containing gas may comprise, consist essentially of, or consists of NH3 (Ammonia). In yet another example, the nitrogen containing gas may comprise, consist essentially of, or consists of one or both of N2 and/or O2, or of N2 and O2. In still yet another example, the nitrogen containing gas may comprise, consist essentially of, or consists of NF3 (Nitrogen trifluoride). In another example, the nitrogen containing gas may comprise, consist essentially of, or consists of a combination of N2/O2 or air or N2/NF3 or N2/NF3/O2 or N2/NH3 or N2/NH3/O2 or N2/SF6 or N2/SF6/O2.

In various embodiments, the microwave plasma may be generated via various techniques. For example, the plasma may be generated using a remote plasma source. For another example, the plasma may be generated using a low-pressure plasma source. Moreover, the plasma may be generated using a near-atmospheric pressure plasma source (e.g., ranging from about 0.5 to about 1.5 atmospheres pressure).

Figure 4A:
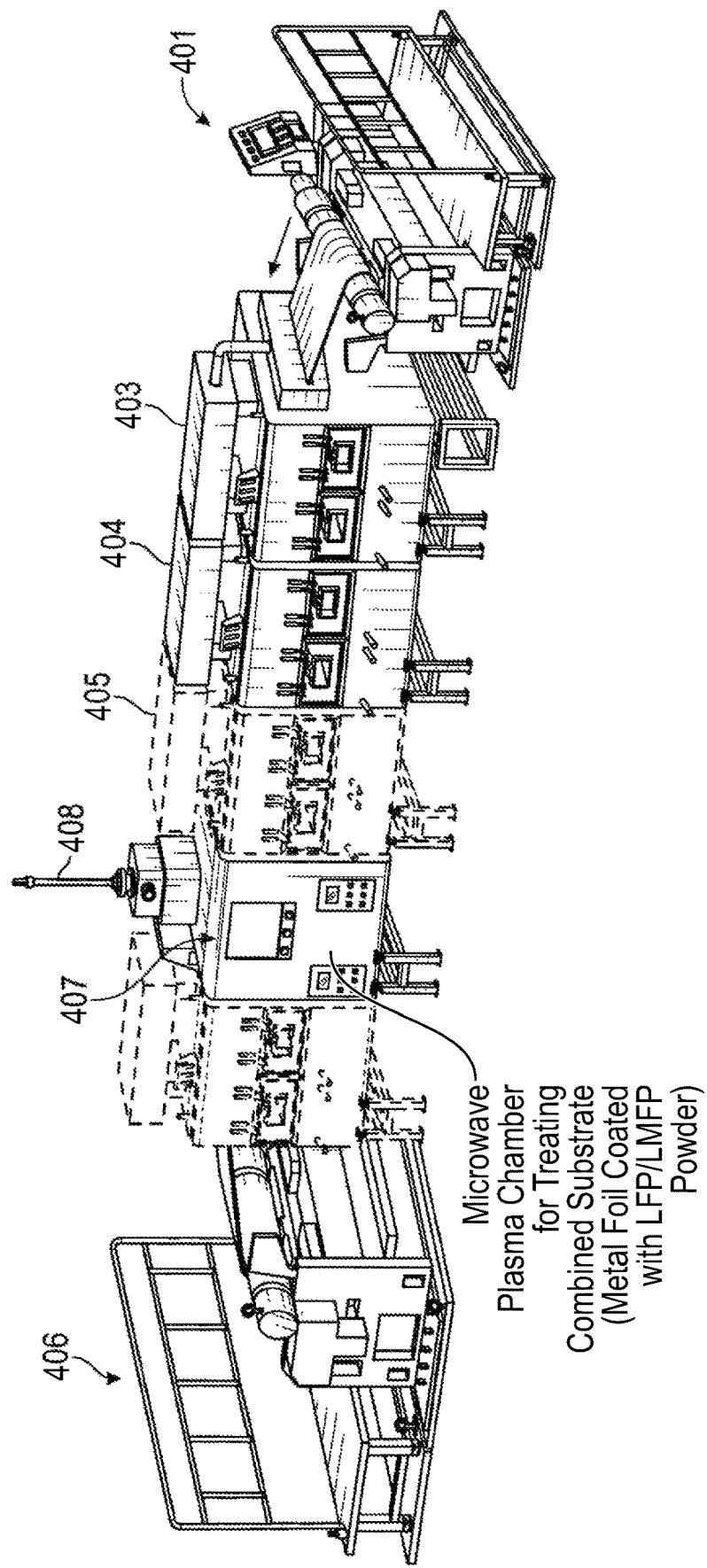
FIG. 4A is a diagram illustrating aspects of an exemplary system used for constructing LFP/LMFP Lithium-ion cells herein, consistent with exemplary aspects of certain embodiments of the disclosed technology.

FIG. 4A is a diagram illustrating aspects of an exemplary system used for constructing LFP/LMFP Lithium-ion cells herein, consistent with exemplary aspects of certain embodiments of the disclosed technology. Referring to FIG. 4A, foil coated with the LFP/LMFP cathode slurry (obtained as set forth above) is fed, typically from a roller 401, into dryers or drying stages, e.g., such as drying stages 403, 404, 405, etc., corresponding to the dryers 203, 204 set forth in FIG. 2. Although a set number of such drying stages are shown in FIG. 4A, it is understood that the dryer stages can vary both in length and number of stages depending on the process requirements, slurry composition, and the like. Upon leaving the last dryer stage 405, the coated foil is fed into the plasma chamber 407, fed by plasma source 408 (e.g., microwave plasma source), for the exposure/treatment via the reactive Nitrogen-containing plasma, as explained in detail elsewhere herein. While the embodiment shown in FIG. 4A includes some drying stages 403-405 before the plasma chamber 407, in other embodiments, the plasma chambers could be placed first and the dryer stages afterwards. After plasma chamber 407, one or more optional dryer stage(s) 409 (which may also include, or instead be, a cool-down stage without any heaters, e.g., in alternative embodiments). Once the foil passes through all the dryer stages and plasma chamber, it may then be rewound, e.g., at 406. After such rewinding, in some embodiments, the foil may be sent back in through various same and/or differing coating, dryer, and/or plasma stages to coat the backside of the foil with cathode material, i.e., for dual-sided coating when that is desired. Further, the foil may be fed through various calendering/rolling machines or processes and/or other or additional standard processes, as set forth above or otherwise known in the art.

Figure 4B:
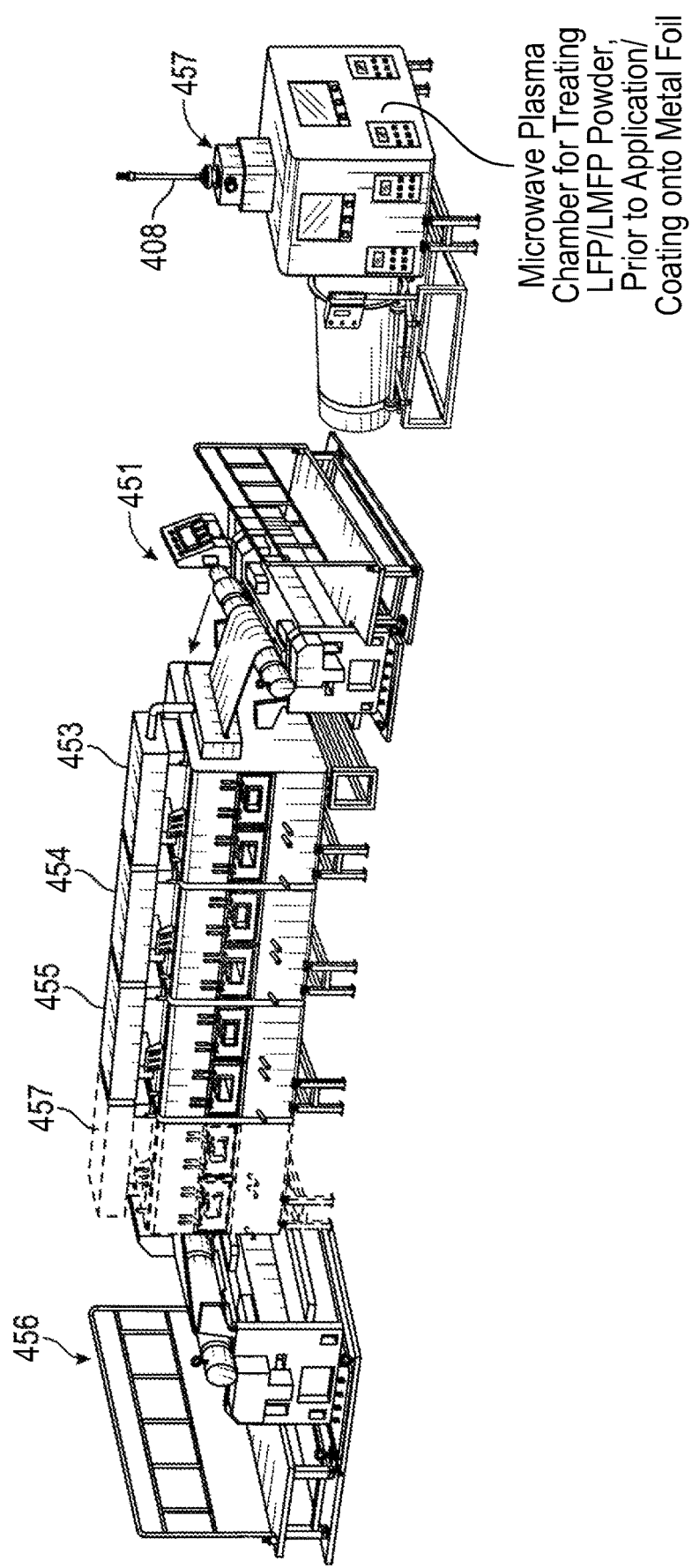
FIG. 4B is a diagram illustrating aspects of another exemplary system used for constructing LFP/LMFP Lithium-ion cells herein, consistent with exemplary aspects of certain embodiments of the disclosed technology.

FIG. 4B is a diagram illustrating aspects of another exemplary system used for constructing LFP/LMFP Lithium-ion cells herein, consistent with exemplary aspects of certain embodiments of the disclosed technology. Referring to FIG. 4B, a Lithium-ion cell fabrication system is shown comprising an initial plasma chamber 457, which may have an external plasma source 408, in some embodiments. Further, once the LFP/LMFP cathode powder or material is treated by the reactive Nitrogen-containing plasma, at the plasma chamber 457, such cathode powder or material may be slurried and/or otherwise placed onto the foil, and then processed through a series of rollers 451, 456, drying stages 453, 454, 455, 457, as well as other optional stages as set forth in FIG. 4B and elsewhere herein.

In alternative embodiments consistent with FIG. 4B, the LFP/LMFP cathode powder may first be treated with a reactive nitrogen containing plasma before coating on to the metal foil. Referring to FIG. 4B, this step treating the cathode powder with a nitrogen-containing plasma is shown, first, in the plasma chamber 457. Here, as previously mentioned, the source gas for this nitrogen containing plasma can be pure N2 or combination of N2/O2 in any percentage including air (~80% N2, 20% O2). Other gases, such as NH3 (ammonia), NF3, or a combination of gases such as N2/NF3 or N2/NH3 or N2/O2/NH3 or N2/O2/NF3 or N2/SF6 or N2/SF6/O2 can be used as the nitrogen source gas for the plasma treatment of this embodiment, as also disclosed elsewhere herein. Following this step of treating the LFP/LMFP cathode material with reactive nitrogen-containing plasma, at 457, various other additional steps consistent with or similar to embodiments herein, such as FIG. 2, may be performed. For example, various further steps may be performed, such as, e.g., an optional step of mixing the cathode powder into a slurry with a solvent. In this step/stage, the treated cathode material is fed into the mixer/slurry making machine. Here, at the slurry mixing machine, the slurry is formulated with the cathode material along with solvent, carbon, binder etc. This slurry is then fed into the coating machine at 451, either manually or automatically, and then coated on the metal (e.g., Aluminum, etc.) foil. Following this step/stage of coating the cathode powder onto a metal foil, another optional step of drying the coated cathode foil at 453-457 (in some embodiments/if or as needed); calendering of the cathode foil; as well as one or more additional steps of continuing with the remaining, standard Lithium-ion cell manufacturing process. Optionally, in some embodiments, the backside of the foil could be coated, and (optionally) dried, and calendered in the same or similar fashion. According to various embodiments, the calendering may be performed on both sides, together (e.g., after the backside is coated and dried, etc.), or it may be performed in 2 or more calendering steps (e.g., once each for each side coating, etc.).

Moreover, in some further hybrid models of both above embodiments, systems and methods herein may be implemented in a manner wherein the cathode powder may initially be treated with the nitrogen-containing plasma at 457 of FIG. 4B, while also including an additional step of treating the coated cathode material with the nitrogen-containing plasma, again, e.g., after it has been coated onto the metal foil, i.e., at step 407 in FIG. 4A. In step 457 of FIG. 4B, the cathode powder is exposed to the plasma including nitrogen-containing gases. Here, again, such Nitrogen containing gas may be or include N2 or NH3 or NF3 or NO or N2O or N2/SF6 or N2/SF6/O2 or other nitrogen containing gases. Other gases such as air or oxygen could also be mixed with the nitrogen containing gases for the plasma. Further, as with the prior embodiment, the plasma frequency can be a microwave frequency between about 800 MHz to about 5000 MHz (i.e. 5 GHz), or between about 800 MHz to about 2500 MHz (i.e. 2.5 GHz), or, in some specific implementations, plasma frequencies such as 915 MHz or 2450 MHz may be utilized.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations of the inventions will be apparent to those skilled in the art from consideration of the specification and practice of the innovations disclosed herein. It is intended that the specification and examples be considered as exemplary only, with a true scope and spirit of the inventions being indicated by the present disclosure and claims and various associated principles of related patent doctrine.

The invention claimed is:

1. A method of fabricating a Lithium-ion cell, the method comprising:
    coating a cathode powder on a metal foil to produce a cathode-coated metal foil;
        wherein the cathode powder comprises one or more cathode active materials;
        wherein the cathode powder includes Lithium and the one or more cathode active materials comprising Lithium Iron Phosphate (LFP) or Lithium Manganese Iron Phosphate (LMFP), and the Lithium is not lithium excess;
    drying, by one or more dryer chambers, the cathode-coated metal foil, wherein each of the one or more dryer chambers is configured with a header, a solvent exhaust collection and a recovery system;
    exposing, by at least one plasma chamber, the cathode-coated metal foil material with treating material comprising nitrogen containing plasma having a reactive nitrogen-containing gas that reacts with the one or more cathode active materials to incorporate Nitrogen into the Lithium-ion cell's cathode active material, wherein the plasma is a near-atmospheric pressure plasma source ranging from about 0.5 to about 1.5 atmospheric pressure;
    wherein frequency of the plasma is a microwave frequency between 800 MHz and 5 GHz;
    calendering or rolling the cathode-coated metal foil treated to incorporate the Nitrogen; and
    placing the cathode-coated metal foil, treated to incorporate the Nitrogen, in a receptacle with a liquid electrolyte, to yield the Lithium-ion cell.

2. The method of claim 1, wherein the nitrogen containing gas is a reactive gas comprising $N_2$.

3. The method of claim 1, wherein the nitrogen containing gas comprises of $NH_3$.

4. The method of claim 1, wherein the nitrogen containing gas comprises $N_2$ and a combination of one or more of N2/O2 or air or N2/NF3 or N2/NF3/O2 or N2/NH3 or N2/NH3/O2 or N2/SF6 or N2/SF6/O2.

5. The method of claim 1, wherein the plasma frequency is between 900 MHz to 3 GHz.

6. The method of claim 1, wherein the plasma frequency is 915 MHz or 2.45 GHz.

7. The method of claim 1, further comprising:
    mixing, via at least one slurry mixing machine, cathode powder with a solvent to generate coating cathode active material.

8. The method of claim 5, wherein the nitrogen containing gas for the at least one plasma chamber is a reactive gas comprising $N_2$.

9. The method of claim 5, wherein the nitrogen containing gas for the at least one plasma chamber is a reactive gas comprising $NH_3$.

10. The method of claim 1, wherein the nitrogen containing gas for the at least one plasma chamber comprises a combination of $N_2$, SF6 and O2.

11. The method of claim 8, wherein the nitrogen containing gas for the at least one plasma chamber further comprises a combination of N2/O2 or air or N2/NF3 or N2/NF3/O2 or N2/NH3 or N2/NH3/O2 or N2/SF6/O2.

12. The method of claim 4, wherein the plasma frequency is between 900 MHz to 3 GHz.

13. The method of claim 4, wherein the plasma frequency is 915 MHz or 2.45 GHz.

14. The method of claim 2, wherein the nitrogen containing gas further comprises a combination of N2/O2 or air or N2/NF3 or N2/NF3/O2 or N2/NH3 or N2/NH3/O2 or N2/SF6 or N2/SF6/O2.

15. The method of claim 2, wherein the plasma frequency is 915 MHz or 2.45 GHz.

16. The method of claim 2, wherein the plasma frequency is between about 900 MHz to about 3 GHz.

17. The method of claim 1, wherein the plasma frequency is about 915 MHz.

18. The method of claim 1, wherein the plasma frequency is about 2.45 GHz.

19. The method of claim 2, wherein the nitrogen containing gas for the at least one plasma chamber further comprises $SF_6$ and $O_2$.

20. The method of claim 19, wherein the plasma frequency is 915 MHz or 2.45 GHz.

* * * * *